Figure 3:
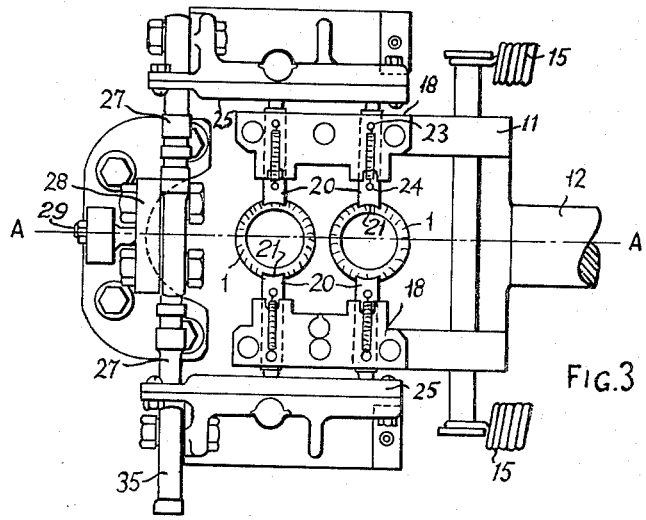

Sept. 26, 1961            G. E. FORD            3,001,506
MACHINE FOR APPLYING SEALING COMPOUND TO BOTTLE CAPS
Filed Feb. 5, 1959            2 Sheets-Sheet 1
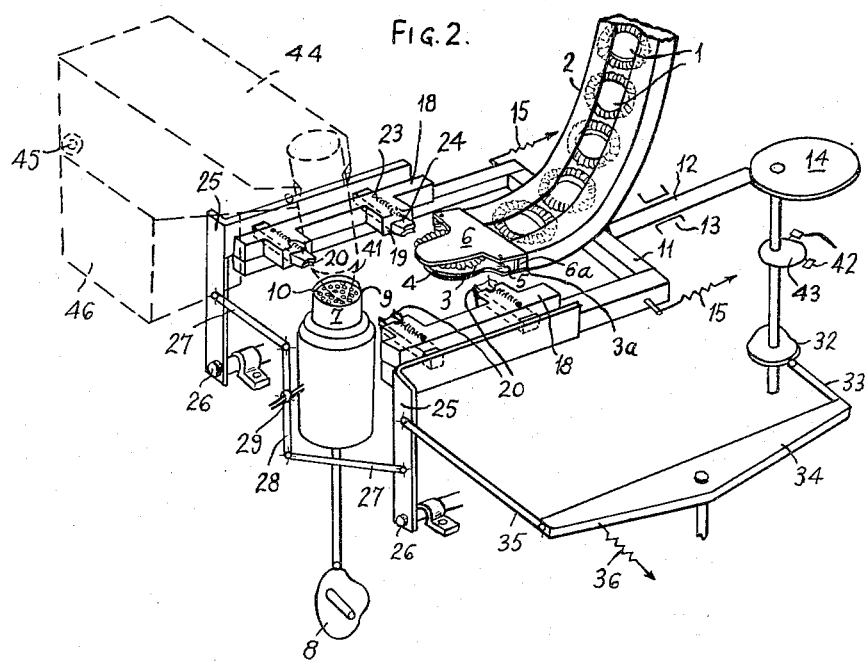
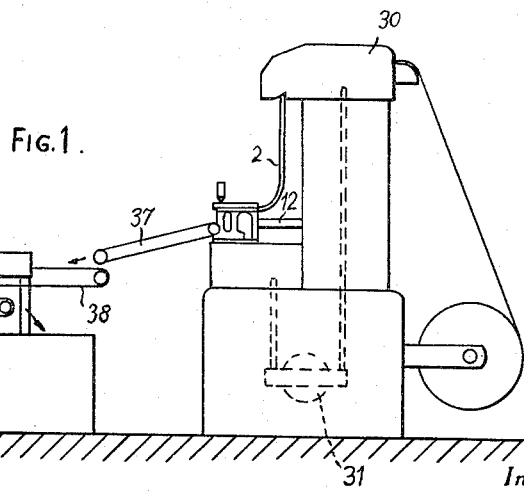
Inventor
G. E. Ford Inventor
G.E. Ford
By,
Attorneys United States Patent Office 3,001,506
Patented Sept. 26, 1961

3,001,506
MACHINE FOR APPLYING SEALING COMPOUND TO BOTTLE CAPS
Geoffrey Ewart Ford, Bedford, England, assignor to Fords (Finsbury) Limited, Bedford, England, a British company
Filed Feb. 5, 1959, Ser. No. 791,367
Claims priority, application Great Britain Feb. 6, 1958
11 Claims. (Cl. 118—318)

The present invention relates to a machine for applying a ring of sealing compound to the interior of caps for closing bottles, jars and other receptacles. More particularly the invention relates to a machine for applying a desired quantity of a rubberised sealing compound in the form of a ring around the internal surface of a crown cap.

An object of this invention is to provide a high-speed machine which will automatically feed the caps to an applying station where the sealing compound is applied while the cap is being rotated, and for removing the treated caps from the applying station and transferring them for example on to a conveyor by means of which they may be passed through an oven or heating device for setting and/or curing the sealing compound.

According to this invention, the preformed caps are fed successively to a retainer device which locates each cap in turn in a predetermined position with the cap substantially horizontal but inverted, and in front of which is arranged a continuously rotating chuck on to which the caps are to be positioned and held whilst being rotated beneath a nozzle for applying the sealing compound, there being provided a cap transfer mechanism comprising two pairs of grippers supported on a reciprocating carriage with the pairs of grippers spaced apart in the direction of reciprocation by a distance corresponding to the distance between the centres of two caps when positioned respectively in the retainer device and on the chuck, the said carriage being reciprocated back and forth in a direction parallel to the line joining the centres of two caps when so positioned in the retainer device and on the chuck and through a distance equal to the said distance therebetween, means also being provided to move the pairs of grippers towards one another when the grippers are in the rearward position with the rear pair of grippers opposite the cap in the retainer device whereby to grip two caps positioned respectively in the retainer device and on the chuck, and to move the pairs of grippers apart when the carriage has been advanced to the forward position with the rear pair of grippers opposite the chuck whereby the cap which has been picked up from the retainer device by the rear pair of grippers will be transferred to and deposited on the chuck and the cap which was previously on the chuck and has been picked up by the front pair of grippers will be transferred to a discharge position and deposited on a discharge chute, conveyor or the like.

According to a feature of the invention, the upper surface of the chuck is hollowed or provided with a peripheral bead for locating thereon the caps to be treated. Preferably the chuck is moved up and down in timed relation with the movement of the transfer grippers so as to be raised, after a cap has been deposited thereon, into the correct position relative to the nozzle during application of the compound, and to be lowered to a position which does not obstruct the movement of the caps during the transfer of the caps to and from the chuck.

According to another feature of the invention, means are provided for producing a delay or dwell during the downward or lowering movement of the chuck so that the cap thereon will temporarily rest at an intermediate level while the grippers of the transfer mechanism move inwardly to grip the cap, whereafter the chuck continues its downward movement so that the peripheral bead will move below the bottom of the cap and will not obstruct the movement of the same during the forward movement of the transfer mechanism. As a cap which has been treated is transferred to the discharge position, a cap which has been withdrawn from the retainer device is moved over the chuck and is released, by the grippers moving apart, as the chuck again moves upward.

The cap is located in position on the chuck by the peripheral bead, and according to a further feature of the invention is held on the chuck by means of suction applied through one or more apertures in the end of the chuck within the peripheral bead.

Figure 4:
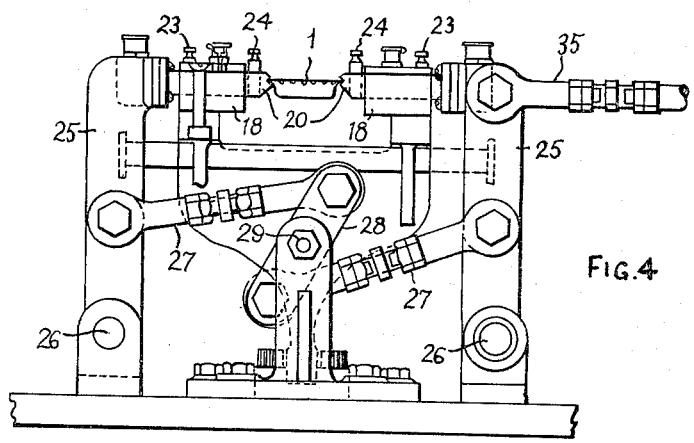
Figure 5:
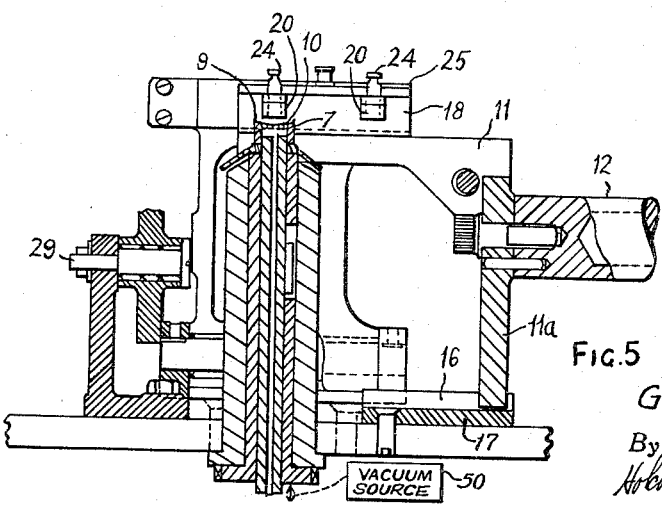

In order that the invention may be more clearly understood, reference will now be made to the accompanying drawings in which:

FIGURE 1 shows diagrammatically the general arrangement of a machine according to this invention for making crown caps and applying the sealing compound thereto, FIGURE 2 is a diagrammatic perspective view of part of the machine showing the cap transfer mechanism, FIGURE 3 is a plan view of a constructional embodiment of the cap transfer mechanism, FIGURE 4 is an end view of FIGURE 3, FIGURE 5 is a longitudinal section along the centre line A—A of FIGURE 3 and showing also the chuck arrangement.

Referring to the drawings, crown caps 1 are fed from a cap-making machine 30 down a chute 2 which maintains the caps in line. The bottom of the chute 2 curves to a horizontal position and is provided at its end with a retainer device which locates the end or leading cap in a predetermined position with the cap inverted, that is with its skirt extending upwardly. The retainer device comprises a lower hinged plate 3 on which the downwardly facing top of the cap rests and is provided with a shallow and preferably part-circular ridge 4 around its front edge to accurately locate the leading cap. Spring means 5 urge the lower plate 3 upwards about the hinge pivot 3a towards a fixed top plate 6, stops 6a being provided for spacing the two plates 3 and 6 apart by a distance which permits a cap to move therebetween, the ridge 4 preventing the cap from moving out of the front end of the retainer device unless the lower plate 3 is forced downwardly against the springs 5. The upper plate 6, and if necessary the lower plate 3, is/are so shaped that the periphery of the skirt of the leading cap positioned in the retainer device can be gripped by the grippers of the transfer mechanism as hereinafter described.

Spaced about two to three inches in front of the retainer is a chuck 7 which is rotatable about a vertical axis and is driven through appropriate gearing from the motor 31 driving the cap-making machine 30. Cam means 8, which may also be driven by the motor 31 in synchronism with the cap-making machine, are provided for moving the chuck up and down, the cam being shaped to provide a dwell in the downward movement of the chuck during the appropriate period of the machine cycle. The upper end of the chuck 7 is formed with a peripheral bead or wall 9 to locate a crown cap therein with the outwardly flared corrugated flange of the skirt projecting above and beyond the wall 9. Suction from the source 50 is applied to the space within the peripheral wall through the holes 10.

The transfer mechanism comprises a carriage 11 which is carried at the end of a push rod 12, mounted for reciprocation in a bearing 13. The carriage and push rod are moved forwards by a cam 14, driven by the motor 31, and move rearwards by springs 15. The carriage 11 is additionally guided by its foot 11a which moves in a groove 16 in a base plate 17. The carriage 11 is constructed with two side arms 18 disposed at opposite sides of the chuck 7. Each side arm 18 has two transverse holes 19 in which are slidably mounted the gripper members 20. The gripper members 20 are arranged opposite to one another in pairs, and each member has its inwardly facing end of arcuate shape and provided with a V-shaped recess 21 for gripping the outwardly flared edge of the skirt of a cap. The pairs of grippers are spaced apart by a distance corresponding to the distance between a cap located in the retainer device and a cap located on the chuck 7.

Springs 22 extending between pegs 23, 24 fixed respectively on the side arms and the gripper members 20 normally urge the gripper members 20 outwardly and into sliding contact with the surfaces of slide members 25 arranged respectively outside the side arms 18. The slide members 25 are pivoted for swinging movement about the horizontal pivots 26 and are interconnected by links 27 and an intermediate rocking lever 28 pivoted at 29 so that the movement of one of the slide members 25 will cause a similar movement of the other slide member in the opposite direction, that is both members will move inwardly or outwardly simultaneously. The slide members are actuated by a cam 32 mounted on the same shaft as the cam 14 which through a push rod 33, actuates a rocker arm 34, the opposite end of which is connected by a link 35 to one of the slide members 25. When the slide members are hinged inwardly, they push on the outer ends of the gripper members 20 to move the latter inwardly to grip a cap positioned therebetween, and when the slide members 25 move outwardly the pairs of gripper members 20 are opened to release the gripped caps. The cam 32 is so shaped and operates in such timed relation with the cam 14, which reciprocates the gripper carriage, that the gripper members will be moved inwardly when the carriage is in its rearward position so as to grip the caps located in the retainer device and on the chuck, and will remain in the gripping position as the carriage moves forward until the carriage reaches its forward position with the rear pair of grippers in line with the chuck, whereupon the cam 32 allows the slide members 25 to move outwardly under the action of the spring 36 to allow the gripper members 20 to move outwardly under the action of their springs 22 to release the caps held therebetween. The cap held between the rear pair of gripper members is thus deposited on the chuck, where it is retained by the applied suction and rotated thereby, and the cap held between the front gripper members is released and transferred on to a discharge chute or transfer conveyor belt 37 which conveys the treated caps on to a further conveyor 38 which passes them through an oven 39, for example an infra-red oven, to set and cure the sealing compound. The caps leaving the oven may be fed on to another conveyor 40 so that they cool before being discharged into a box. By appropriately shaping the surfaces of the slide members 25 and/or the front gripper members, it can be arranged for the cap held between the front pair of gripper members to be released just prior to the end of the forward stroke of the transfer carriage, whereby the treated caps will be discharged from the front pair of gripper members with a forward component of motion corresponding to the speed of the transfer conveyor 37. This produces substantially equal spacing of the caps on the transfer conveyor and hence on the oven conveyor 38.

The nozzle 41 for applying the sealing compound may be of known construction incorporating a pneumatically operated needle valve controlled by a solenoid or the like. The solenoid is adapted to be automatically controlled by micro-switches 42 actuated by a cam 43 synchronised with the machine cycle. The nozzle 41 is mounted on a carriage 44 pivoted at 45 to a base support 46 so that the carriage 44 can be swung upwardly to move the nozzle away from the chuck, when required. The nozzle carriage may be provided with means for adjusting the transverse position of the nozzle relative to the chuck and may also be provided with an adjustable stop for locating its vertical position. This stop preferably bears on a member which operates a micro-switch which, when the carriage is raised, disconnects the electro-pneumatic valve from the automatic control switches 42 and connects the valve to manually-operated switches. The automatic control switches 42 are so controlled by the cam 43 that compound will be discharged from the nozzle 41 during one complete revolution of the chuck and thus provide a continuous ring of compound around the internal surface of the cap. The compound may be fed to the nozzle by a known pumping arrangement.

Supervisory controls may be provided for ensuring correct operation of the machine and for preventing untimely discharge of compound from the nozzle. For example, the driving motor control switch may be such that when it is switched off it actuates supplementary switching means for ensuring that the electro-pneumatic control valve of the nozzle will be moved to the closed position and also to disconnect the automatic control switches and to connect the valve for operation by a manual control switch. This enables the machine to be turned over by hand without discharging sealing compound. Means may also be provided for preventing discharge of the compound when no cap is on the chuck; this may be effected by a switch controlled by the degree of suction in the chuck. A receptacle for collecting compound may be moved manually or automatically in front of the nozzle when the nozzle carriage is raised so as to collect any compound which is manually or otherwise discharged from the nozzle when in the raised position.

A machine constructed as described can operate to apply compound to crown caps at the rate of 300 caps per minute or more.

Whilst a particular embodiment has been described, it will be understood that various modifications may be made without departing from the scope of the invention. For example, the caps may be fed into the chute 2 from a hopper. Further, by appropriate modification of the chute and chuck the machine can be adapted for applying sealing compound to other caps, for example to caps for jam jars.

I claim:

1. A machine for applying sealing compound to the interior of caps for receptacles, comprising a retainer device, means for feeding caps to the retainer device so that the leading cap will be located in a predetermined position with the cap horizontal but inverted, a chuck arranged in front of said retainer device, means for rotating the chuck about a vertical axis, means for positioning and holding a cap on said chuck to rotate therewith, a nozzle for applying sealing compound to a cap when positioned on the chuck, and a cap transfer mechanism comprising a carriage mounted for movement in guides in a direction parallel to the line joining the centres of two caps when positioned respectively in the retainer device and on the chuck, means for reciprocating said carriage through a distance equal to the distance between said centres, two pairs of gripper members supported on said carriage with the pairs of gripper members spaced apart in the direction of reciprocation of the carriage by a distance corresponding to the said distance between the said centres, the gripper members of each pair being mounted on said carriage for movement relative thereto transversely to the direction of reciprocation of the carriage and normally spaced apart by a distance greater than the diameter of the caps to be transferred, and means for moving the gripper members of each pair towards one another when the carriage is in the rearward position with the rear pair of gripper members opposite the cap in the retainer device whereby to grip two caps positioned respectively in the retainer device and on the chuck, and to move the pairs of gripper members apart when the carriage has been advanced to its forward position with the rear pair of gripper members opposite the chuck.

2. A machine as claimed in claim 1, wherein the chuck is provided at its top with a peripheral bead for locating caps thereon.

3. Machine as claimed in claim 2, wherein the chuck is mounted for vertical movement, means being provided for moving the chuck up and down in timed relation with the movement of the transfer gripper members, the chuck being lowered during forward movement of the carriage to a position which does not obstruct movement of the caps during transfer of the caps to and from the chuck and being raised after a cap has been deposited thereon.

4. Machine as claimed in claim 3, wherein means are provided for producing a dwell during the lowering movement of the chuck so that the cap thereon will temporarily rest at an intermediate level while the gripper members of the transfer mechanism move inwardly to grip the cap.

5. A machine as claimed in claim 4, wherein means are provided for applying suction to the chuck to retain the caps thereon.

6. Machine as claimed in claim 1, wherein the carriage comprises two side arms disposed at opposite sides of the chuck, the gripper members being mounted for movement transversely of the side arms and being urged outwardly by springs to engage slide members, means being provided for moving the said slide members inwardly and outwardly to move the gripper members inwardly to the gripping position and to allow them to move under the action of their springs to their non-gripping positions.

7. Machine as claimed in claim 1, wherein the retainer device comprises a hinged plate having an upwardly extending ridge to locate a cap thereon and a fixed upper plate, a stop for limiting the minimum spacing of between said plates to allow a cap to enter therebetween, and spring means for urging the hinged plate to the stop position and permitting the hinge plate to hinge downwardly when a cap is withdrawn from the retainer device.

8. A machine for applying sealing compound to the interior of caps for receptacles, comprising a retainer device, a chute for feeding caps to the retainer device so that the leading cap will be located in a predetermined position relative to the retainer device with the cap horizontal but inverted, a rotatable chuck arranged in front of said retainer device, drive means for continuously rotating the chuck about a vertical axis, means for positioning and holding a cap centrally on said chuck to rotate therewith, a nozzle disposed above the chuck for applying sealing compound to a cap when positioned on the chuck, and a cap transfer mechanism comprising a carriage mounted for movement in guides in a direction parallel to the line joining the centres of two caps when positioned respectively in the retainer device and on the chuck, means for reciprocating said carriage through a distance equal to the distance between said centres, said carriage comprising two side arms disposed at opposite sides of said chuck, a front pair of gripper members mounted respectively in opposing positions on said side arms for movement transversely of the direction of reciprocation of the carriage, a rear pair of gripper members mounted respectively in opposing positions on said side arms for movement transversely of the direction of reciprocation of the carriage, said front pair of gripper members being spaced from the rear pair of gripper members in the direction of reciprocation of the carriage by a distance equal to the said distance between the said centres with the front pair of gripper members more remote from said retainer device than said rear pair of gripper members, two slide members disposed respectively outside said side arms, springs for urging said gripper members outwardly to engage said slide members, and actuating means for moving said slide members, said actuating means moving the slide members inwardly when the carriage is in the rearward position with the rear pair of gripper members opposite the cap in the retaining device whereby to move the gripper members of each pair towards one another to grip two caps positioned respectively in the retainer device and on the chuck, and said actuating means moving said slide members outwardly when the carriage has been advanced to its forward position with the rear pair of gripper members opposite the chuck whereby to allow the gripper members to move outwardly under the action of the springs to release the caps held therebetween.

9. Machine as claimed in claim 8, wherein the retainer device comprises a hinged plate having an upwardly extending ridge to locate a cap thereon and a fixed upper plate, a stop for limiting the minimum spacing between said plates to allow a cap to enter therebetween from the chute, and spring means for urging the hinged plate to the stop position and permitting the hinge plate to hinge downwardly when a cap is withdrawn from the retainer device, the fixed plate being located so that a cap pressed thereagainst by the spring-urged hinged plate will be held at the correct level to be gripped by the rear pair of gripper members.

10. A machine for applying sealing compound to the interior of caps for receptacles, comprising a retainer device, a chute for feeding caps to the retainer device so that the leading cap will be located in a predetermined position relative to the retainer device with the cap horizontal but inverted, a rotatable chuck mounted for vertical movement in front of said retainer device, drive means for continuously rotating the chuck about a vertical axis, means for positioning and holding a cap centrally on said chuck to rotate therewith, a nozzle disposed above the chuck for applying sealing compound to a cap when positioned on the chuck, and a cap transfer mechanism comprising a carriage mounted for movement in guides in a direction parallel to the line joining the centres of two caps when positioned respectively in the retainer device and on the chuck, means for reciprocating said carriage through a distance equal to the distance between said centres, said carriage comprising two side arms disposed at opposite sides of said chuck, a front pair of gripper members mounted respectively in opposing positions on said side arms for movement transversely of the direction of reciprocation of the carriage, a rear pair of gripper members mounted respectively in opposing positions on said side arms for movement transversely of the direction of reciprocation of the carriage, said front pair of gripper members being spaced from the rear pair of gripper members in the direction of reciprocation of the carriage by a distance equal to the said distance between the said centres with the front pair of gripper members more remote from said retainer device than said rear pair of gripper members, two slide members disposed respectively outside said side arms, springs for urging said gripper members outwardly to engage said slide members, actuating means for moving said slide members, said actuating means moving the slide members inwardly when the carriage is in the rearward position with the rear pair of gripper members opposite the cap in the retaining device whereby to move the gripper members of each pair towards one another to grip two caps positioned respectively in the retainer device and on the chuck, and said actuating means moving said slide members outwardly when the carriage has been advanced to its forward position with the rear pair of gripper members opposite the chuck whereby to allow the gripper members to move outwardly under the action of the springs to release the caps therebetween, mechanism for moving the chuck up and down from an upper position in which a cap thereon will be located in the position for applying sealing compound from the nozzle and a lower position in which the chuck does not obstruct the transfer movement of caps gripped by said gripper members, said mechanism operating to produce a dwell during the lowering movement of the chuck so that the cap thereon will temporarily rest at an intermediate level at which it is adapted to be gripped by the gripper members, and synchronising means coordinating the operation of said slide actuating means, carriage reciprocating means and the chuck moving mechanism in a machine cycle to move the slide members inwardly during said dwell when the chuck is at said intermediate level, to move the carriage forwardly immediately following said dwell, and to move the chuck upwardly and the slide members outwardly upon the carriage reaching its forward position.

11. A machine as claimed in claim 10, wherein the slide members and front gripper members are shaped to allow the front pair of gripper members to move apart to a non-gripping position before the carriage reaches its forward position, whereby to give a forward component of motion to the cap released from the front pair of gripper members.

References Cited in the file of this patent

UNITED STATES PATENTS

| | | |
|---|---|---|
| 1,782,450 | Taylor | Nov. 25, 1930 |
| 2,189,783 | Eberhart | Feb. 13, 1940 |
| 2,608,738 | Arelt | Sept. 2, 1952 |
| 2,612,729 | Walley et al. | Oct. 7, 1952 |
| 2,731,946 | Birkland | Jan. 24, 1956 |
| 2,838,024 | Rekettye | June 10, 1958 |